April 4, 1939.  V. PARKINS  2,152,971
FISH LURE
Filed May 1, 1937
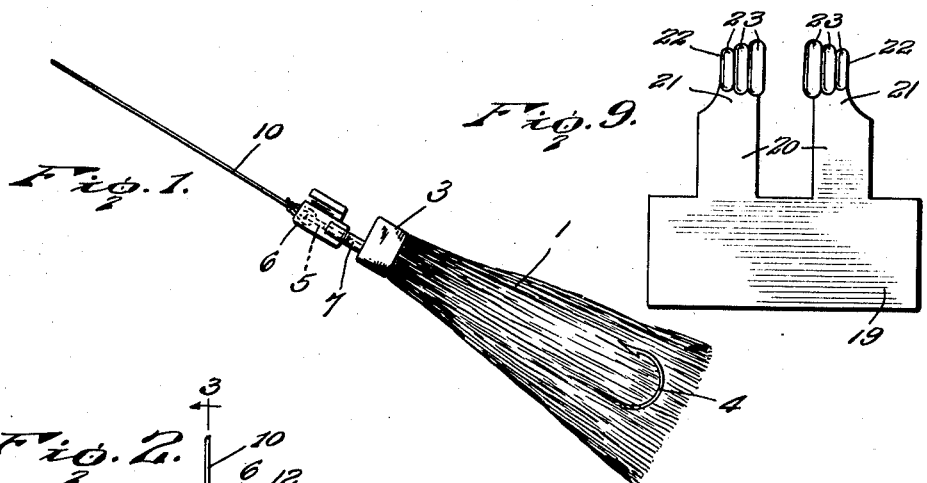
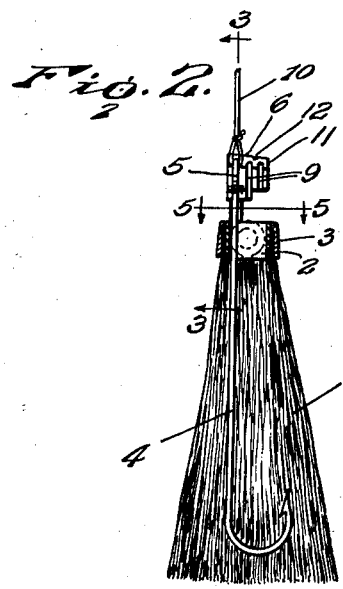
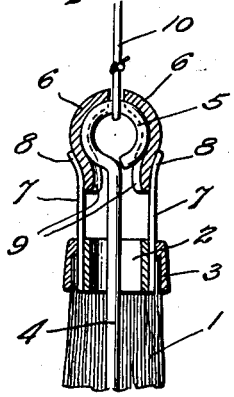
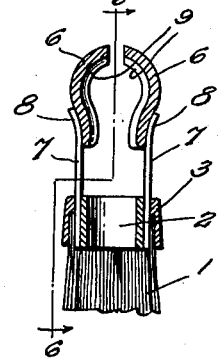
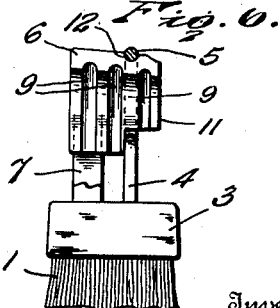
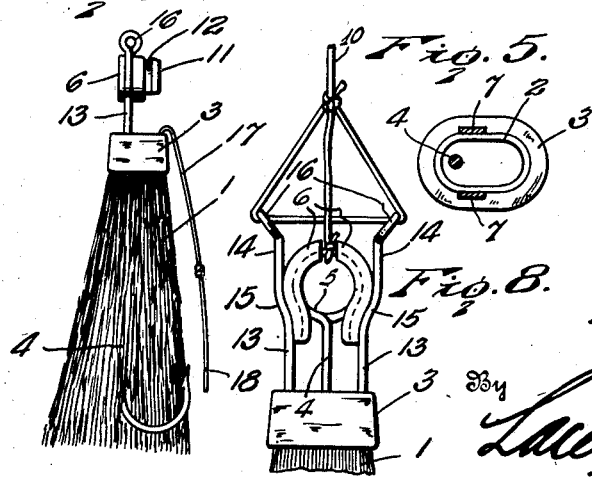
Inventor
Virgil Parkins.
By Lacey & Lacey
Attorneys Patented Apr. 4, 1939

2,152,971

UNITED STATES PATENT OFFICE 2,152,971

FISH LURE

Virgil Parkins, Tiffin, Ohio

Application May 1, 1937, Serial No. 140,230

5 Claims. (Cl. 43—42).

This invention relates to an artificial lure for fish, and it is one object of the invention to provide a lure of such construction that a hook of a desired size may be applied, thus permitting the lure to be used for catching either large or small fish.

It is another object of the invention to so mount the hook that, while it will be detachably mounted, it will be firmly held when applied and prevented from accidentally slipping out of a secured position.

Another object of the invention is to so construct the means for detachably mounting a hook that, if so desired, more than one hook may be applied.

The invention is illustrated in the accompanying drawing, wherein

Figure 1 is a perspective view showing the artificial lure connected with a fishing line.

Figure 2 is a sectional view taken longitudinally through the artificial lure and illustrating by dotted lines the manner in which the hook is applied to or removed from the hook-securing means.

Figure 3 is a sectional view upon an enlarged scale taken along the line 3—3 of Figure 2, Figure 4 is a view similar to Figure 3 with the hook removed, Figure 5 is a fragmentary sectional view taken along the line 5—5 of Figure 2, Figure 6 is a view taken along the line 6—6 of Figure 4, Figure 7 is a view in side elevation of a modified form of artificial lure, Figure 8 is a view in elevation of the upper portion of Figure 7, the view being taken at right angles to Figure 7, and Figure 9 is a view of a blank from which a lure of a modified construction is formed.

The body portion of this improved artificial lure consists of a tuft 1 which may be formed of hair, fiber or equivalent material. The strands of fibrous material from which the tuft or body is formed have their upper end portions disposed about a collar 2 which is of substantially elliptical form when viewed in top plan, as shown in Figure 5. Therefore, the collar will be of greater length than width and formed with flat side walls and arcuate end walls. A retainer ring or band 3 which may be formed of rubber or a water-proof cement or equivalent material is applied about the upper end portions of the strands after they have been disposed about the collar and serves to very firmly hold the strands in place to form a fibrous body having its central portion open, as shown in Figures 2, 3 and 4, so that a hook 4 may be mounted in position to extend longitudinally through the body, as shown in Figures 1 and 2. This hook is formed with the usual eye 5 at its upper end which is a diameter greater than the transverse axis of the collar but less than the major axis of the collar and, by comparing Figures 2, 3 and 5, it will be readily seen that, while the eye may be easily passed through the collar 2 when the hook is turned to the position indicated by dotted lines in Figure 2, it cannot be passed through the collar when in the position shown in Figure 3 and in full lines in Figure 2 without being first turned to the position indicated by dotted lines in Figure 2. Therefore, even if the eye of the hook should accidentally slip from between the jaws 6, the hook must be turned before the eye can pass downwardly through the collar and loss of the lure will probably be avoided.

The jaws 6 are carried by arms 7 formed from strips of resilient metal which are soldered, brazed or otherwise secured against outer faces of the opposed flat side walls of the collar. These arms extend upwardly from the collar and have their upper end portions bent to provide flared portions 8 which overlap lower portions of the two jaws and are brazed or otherwise firmly secured thereto. It will thus be seen that the jaws will be normally held adjacent each other in position to grip the eye of a hook but may be shifted away from each other to permit the hook to be applied or removed. The jaws are elongated, as clearly shown in Figures 2 and 6, and each is formed with a sloping upper portion, as shown in Figure 6, so that, when the two jaws are in position above the collar, the space or passage between the confronting faces of the jaws will taper toward one end. Grooves 9 are formed in the inner faces of the two jaws in spaced relation to each other longitudinally thereof, as clearly shown in Figure 6, and upon referring to this figure, it will be seen that the grooves or recesses define seats which decrease in size from the left hand end of the jaw to the right hand end. The grooves or recesses of one jaw are in opposed relation to the corresponding grooves or recesses of the other jaw, and since these grooves or recesses decrease in size from one end of the jaws toward the other end thereof, either large or small hooks may be selectively applied or a large hook and a small hook gripped between the jaws. A large hook has been shown in place with its eye engaged in the large grooves or recesses of the two jaws between which the eye is firmly gripped, and since there has been shown three grooves or recesses in each jaw, a medium sized hook or a small hook may be applied instead of the large hook. It is to be understood that, while three grooves have been shown in each jaw, as many grooves as desired may be be provided by increasing or decreasing the number. It will also be readily understood that, if so desired, a large hook and a smaller hook may be applied and both secured between the jaws at the same time with the smaller hook terminating intermediate the length of the shank of the large hook. It will also be understood that, if so desired, two hooks having eyes of the proper size to be engaged in grooves of the jaws may be applied and so disposed that their hooked end portions will extend in opposite directions. The upper edges of the jaws are spaced slightly from each other and, therefore, the fishing line 10 carried through the eye of the hook may pass through the space between the upper edges of the jaws, as clearly shown in Figures 2 and 3.

When this artificial lure is in use, the fishing line is carried through the eye of a selected hook and the eye of the hook engaged between the jaws so that the shank of the hook extends through the collar 2 longitudinally of the fibrous body. The fibrous body will then be firmly held in place about the hook. If the hook catches far down in the mouth or throat of a fish and it is difficult to release it due to the presence of the fibrous body, it is merely necessary to grasp the body about the collar and exert pull to force the jaws out of gripping engagement with the eye and shift the collar and the fibrous body along the shank of the hook after turning the collar to such a position that the eye may pass freely through the collar. A disgorger may then be employed to release the hook. It will also be noted that in case a small fish is caught and it is desired to return the fish to the water without removing the hook the fibrous body may be shifted along the shank of the hook and onto the line, as previously set forth, and the line then untied from the eye of the hook. The fish may then be returned to the water and since it is not torn by removal of the hook it will not die due to the effect of being caught. The end portions of the two jaws in which the smallest grooves or recesses 9 are formed are cut-away to provide reduced end portions 11, and these end portions are formed with external grooves or recesses 12 constituting seats for the eye of the hook and thus permitting the eye of the hook to be engaged about the jaws instead of between them. Such an arrangement of parts is illustrated in Figure 6, and since the jaws are normally spaced from each other, as shown in Figure 4, they may be forced toward each other as the eye is moved into place over the reduced end portions 11 and then spring apart to seat the eye in the groove 12.

In Figures 7 and 8, there has been illustrated a modified construction, but since certain elements of the artificial lure are of the same construction previously described, the same reference numerals have been used. In this embodiment of the invention, the jaws 6 are carried by arms 13 formed from strands of resilient metal which have their lower ends secured against inner faces of the opposed flat side walls of the collar. The strands from which the arms are formed are of greater length than the strips from which the arms 7 are formed and they project upwardly from the jaws, as shown at 14, after their bent portions 15 have been soldered or otherwise firmly secured against outer side faces of the jaws. Upper extremities of the strands are bent to form eyes 16 which are disposed diagonally to extend outwardly at an upward incline from upper ends of the arms, as shown in Figure 8. When this form of artificial lure is in use, the fishing line may be tied through the two eyes 16 instead of through the eye of the hook and the jaws will then be drawn toward each other into very tight gripping engagement with the eye of the hook. If so desired, an end of the line may be tied through the eye of the hook between the upper edges of the jaws after the line has been tied through the eyes 16 and thus very effectively prevent loss of the hook or the fibrous body portion of the lure. A weed guard 17 formed of resilient wire extends longitudinally of the fibrous body and has its upper end bent downwardly and secured to the collar. This weed guard is of sufficient length to extend beyond the barb of the hook and has its lower portion formed with forks 18 which extend at opposite sides of the hook so that weeds will be very effectively prevented from catching upon the hook.

While the body has been illustrated and described as being formed of fibers, it will be understood that the body may be of other materials and have the configuration of a frog, spinner, spoon or the like.

Instead of forming the collar, arms, and the gripping jaws separately and then securing the arms to the collar and the jaws so that the jaws will be supported above the collar in spaced relation thereto, these elements may be formed from a blank of resilient sheet metal shown in Figure 9. This blank has a rectangular body 19 which is of oblong outline, as shown, and from one side edge of this body extend tongues 20 which have their free end portions reduced in width, as shown at 21, and terminating in heads 22. The heads are stamped to provide elongated cupped portions 23 forming seats corresponding to the seats 9 when the tongues and their heads are bent to form arms and jaws corresponding to the arms 7 and the jaws 6. By properly bending the body 19 of the blank and securing its ends together, a collar will be formed which corresponds to the collar 2 and the arms formed by the tongues 20 will project upwardly from opposite sides of the collar. It will thus be seen that the collar and the arms and their heads may be formed from a single blank of sheet metal at a small cost.

Having thus described the invention, what is claimed as new is:

1. In an artificial lure, a body including a collar, a hook extending longitudinally in said body with its shank passing through the collar and provided with an eye above the collar, resilient arms carried by said collar at opposite sides thereof, and jaws carried by said arms and having their inner faces formed with a plurality of opposed companion grooves, said arms yieldably holding said jaws in position to grip the eye about opposite portions of the periphery with the eye engaged in a selected set of grooves and detachably mount the hook in a predetermined position in the body.

2. In an artificial lure, a body including a collar at its upper end, a shook extending longitudinally in said body with its shank passing through the collar and provided with an eye located above the collar, resilient arms extending upwardly from the collar at opposite sides thereof, and jaws carried by said arms in opposed relation to each other and having their inner faces formed with opposed grooves constituting seats to selectively receive opposite side portions of the periphery of the eye and cause the eye to be firmly gripped between the jaws and detachably mount the hook in a predetermined position in the body.

3. In an artificial lure, a body including a collar at its upper end, a hook having its shank extending through the collar and provided with an eye above the collar, jaws having their inner faces formed with grooves, resilient arms for supporting said jaws in position to receive the eye of the hook between them with portions of the eye engaged in the grooves, and line-engaging eyes at the upper ends of the arms.

4. In an artificial lure, a body having a collar at its upper end, resilient arms extending upwardly from the body at opposite sides thereof, and jaws carried by said arms and having their confronting faces recessed to receive portions of an eye of a hook to mount the hook in position longitudinally of the body, said jaws being tapered towards one end and adjacent their smaller ends being reduced to provide portions for passing through an eye of a hook to mount last-mentioned hook in position to extend longitudinally of the body.

5. In an artificial lure, a body having an elliptical collar at its upper end, resilient arms extending upwardly from the collar at opposite sides thereof, a hook having a shank extending through the collar between the arms and formed at its upper end with an eye of a diameter greater than the transverse axis of the elliptical collar but less than the major axis of the collar whereby the eye may be passed through the collar and then turned and disposed transversely of the collar to prevent return movement of the eye through the collar, and jaws carried by said arms above said collar in position for engaging an eye of the hook about the periphery thereof from opposite sides and detachably mounting the hook longitudinally in the body.

VIRGIL PARKINS.